Feb. 14, 1928.
J. WALDES
FASTENING DEVICE
Filed April 12, 1927
1,658,955
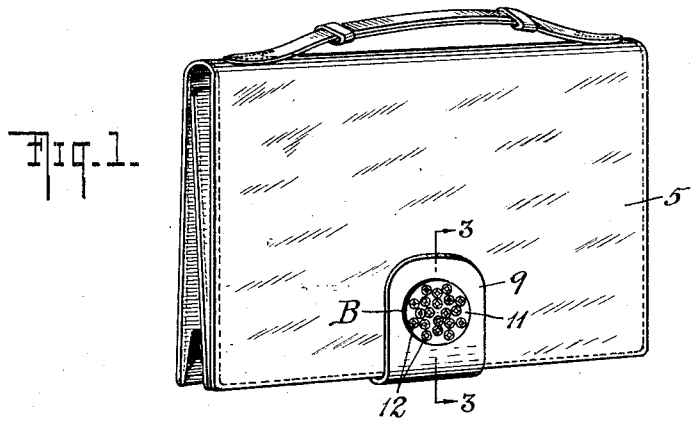
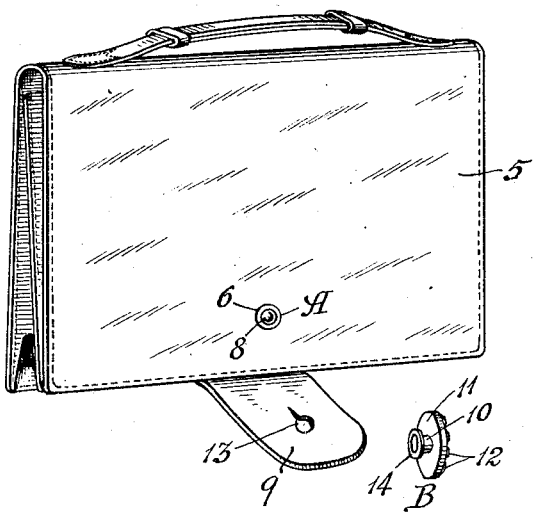
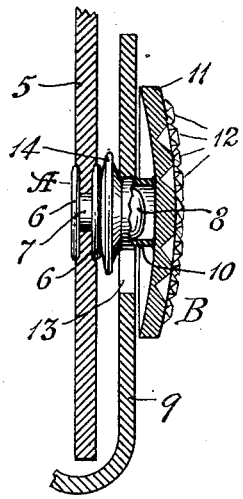
WITNESS
G. V. Rasmussen
INVENTOR
JINDRICH WALDES
BY
ATTORNEYS Patented Feb. 14, 1928.

1,658,955

UNITED STATES PATENT OFFICE.

JINDRICH WALDES, OF NEW YORK, N. Y.

FASTENING DEVICE.

Application filed April 12, 1927. Serial No. 183,027.

The invention relates to fastening devices and more particularly to that class of such devices which are designed to maintain two elements in detachable connection with each other. Devices of the type in question are exemplified by buttons and button-holes, the fastening means of ladies' hand bags, the conventional snap fasteners, and by kindred devices in which the ornamental appearance of the visible member of the device, is an important factor. The object of the invention is to provide a fastening device of the indicated character which permits a ready interchangeability of the element of the device which embodies the ornamental features and thereby makes it possible to vary the ornamental character and appearance of the fastening device at will, without disturbing or interfering with its intended functions. Other objects of the invention will appear from the description hereinafter and the features of novelty will be pointed out in the claim.

In the accompanying drawing, which illustrates an example of the invention without defining its limits, Fig. 1 is a perspective view of a ladies' conventional hand bag with the novel device embodied therein; Fig. 2 is a similar view showing the interchangeability of the device; and Fig. 3 is a fragmentary enlarged section on the line 3—3 of Fig. 1.

For the purpose of illustrating the utility of the invention and its operation, I have shown it embodied in the fastening means of a ladies' hand bag of conventional form; it will be understood that the device may be used to equal advantage in many other forms, as for instance a fastening device for footwear and the like, or in other words a fastening means for detachably securing two members in overlapping connection, in which the factor of ornamentation plays a part.

In the illustrated example the body 5 of the bag, which exemplifies one of the members with which the fastening device is combined, carries one element A of said device, this element being permanently secured in any customary manner to the member 5 on which it is mounted. In the illustration this element A comprises the male element of a two part fastener of the snap fastener type and consists of two disks 6 located upon opposite surfaces of a suitable portion of the body 5 and a connecting stem 7 which passes through said body portion as shown in Fig. 3; the customary stud 8 projects from the outside disk 6 in the usual manner in perpendicular relation thereto and in juxtaposition to the supporting opening 13 (to be described later) in the tab 9. The other element which is to be detachably fastened to the member or body 5 in overlapping relation thereto is exemplified by the flexible tab 9. As shown in Figs. 2 and 3 this member or flexible tab 9 carries the co-operating element B of the fastening device which is mounted upon said tab or its eqivalent in a manner to be easily separated therefrom at will. In the drawing, the element B is shown as constructed for snapping engagement with and disengagement from the member A and accordingly comprises an element adapted for co-operative fastening relation with element A, incorporated or mounted in a hollow stem 10 and arranged to snap over the stud 8 of the element A; it will be understood that the usual means are included in the fastening device for maintaining said stud 8 and stem 10 in connection with each other without interfering with the intentional disengagement of the members A and B. The stem 10 is an extension of or secured to the flange or disk 14 and is also soldered to a head 11 or is secured thereto in an equivalent manner, said stem being so dimensioned that between the plane of those parts of the flange 14 which will contact with the tab 9 in the assembled structure and the plane of those parts of the head 11, which in the assembled structure are closest to the opposite surface of the said tab 9, there remains a space approximating the thickness of said tab. The head 11 is either wholly or in part of an ornate or ornamental character and is dimensioned to span the opening 13 and to conceal the same; thus in the illustrated example the head 11 is set with a plurality of rhinestones 12 or their equivalent arranged in any predetermined design. Because of the fact that the stem 10 is secured to the head 11 by soldering or in an equivalent manner, it is possible to include such stones 12 or other fragile ornaments in the head 11 which otherwise would be smashed by the pressure developed during the manufacture of the member B of the fastening device in the ordinary way.

In the illustrated example the separable connection between the member or tab 9 and the fastening element B is effected by providing said tab 9 or its equivalent with a supporting opening 13 for element B and said opening may be in the form of a conventional button-hole of predetermined limited size with respect to the flange or disk 14 and through said opening the hollow stem 10 extends as shown in Fig. 3; unintentional removal of the fastening member B from the tab 9 is prevented by the head 11 at one end of said stem 10 and by a flange or disk 14 located at the other end thereof, the head and disk being both larger than the opening 13 in its normal condition, but the disk 14 being of such dimensions as to be capable of being forced through said opening 13 by insertion at an angle to the plane of the supporting member when detachment of the element B, as shown in Fig. 2, is desired.

The complete assembly of the aforesaid overlapping members 5 and 9 and of the fastener elements A and B is such that while an established relation is preserved as between the members 5 and 9, the supporting opening 13 and the fastener element A, there is afforded at the same time an opportunity of ready interchangeability as between the ornate fastener element B with a differently ornamented element of the same construction and no matter how often the element B is replaced in this way, each such ornate element will always automatically assume its proper seat in the opening 13 with respect to the fixed or permanently secured fastener element A. The fact that the opening is of limited dimensions and that the space between the innermost parts of the flange 14 and of the head 11 defines a space which approximates the thickness of the tab 9 assures a condition of maximum composite stability of structure, preventing undue wobbling or sliding of the ornamented button or accidental detachment of said button B from the tab 9.

With the arrangement shown and described one of the fastening elements is permanently secured in proper position on the article in which the fastening device is to perform its functions and the other fastening element adapted to co-operate with said first element, is part of a removable mounting carried by an associated part of said article. The permanently secured element may be the male section of the fastening device as shown or it may in some cases be the female section thereof, the removably mounted element being the female section as shown, or the male section as the case may require. By mounting the one fastener element in a manner to enable it to be easily and quickly separated from the article for which it is designed, without interfering with its co-operative action with the permanently secured fastening element, it is possible to substitute removable fastening elements of different ornamental or other physical characteristics. Thus it is possible to select a fastening element of predetermined characteristics, either ornamental or otherwise, for incorporation in the article in question at will. The hand bag chosen for illustrative and descriptive purposes may thereby be given individual and varied appearances by simply changing the fastening section B; similarly the same footwear may be made adaptable for different occasions by simply combining therewith, at will, a fastening section B having ornamental or other characteristics in harmony with any given or particular event or purpose.

Various changes in the specific form shown and described may be made within the scope of the claim without departing from the spirit of my invention.

I claim:

The combination of two members adapted to be detachably connected, one of said members having a fastener element supporting opening of predetermined limited size therein, a fastener device of the snap fastener type consisting of two co-operating fastener elements, one of which is permanently secured to the second of said members in juxtaposition to the supporting opening in the first of said members, the second of the two co-operating fastener elements being incorporated in a mounting which in turn comprises an ornate head, a flange and a stem connecting the head and flange, the ornate head being dimensioned to span the aforesaid supporting opening and concealing the same, the flange being dimensioned with respect to the opening so as to be capable of being passed through the opening by insertion at an angle to the plane of the supporting member, the stem being dimensioned to establish between the plane of contact of the flange with the supporting member and of the plane defined by those parts of the head closest to the other side of said supporting member, a space approximating the thickness of the supporting member, the assembly of the aforesaid members and fastener elements being such that while preserving an established relation as between the members, the supporting opening, and one of the fastener elements, ready interchangeability is afforded as between the other and ornate fastener element and other corresponding ornate fastener elements of different appearance, each of such ornate fastener elements automatically assuming its proper seat in the supporting opening with respect to the permanently secured fastener element.

In testimony whereof I have hereunto set my hand.

JINDRICH WALDES.